United States Patent [19]

Lemos

[11] Patent Number: 5,511,470
[45] Date of Patent: Apr. 30, 1996

[54] APPARATUS FOR SPLITTING PISTACHIOS

[76] Inventor: Robert F. Lemos, 21857 Brennan Rd., Escalon, Calif. 95320

[21] Appl. No.: 257,275

[22] Filed: Jun. 9, 1994

[51] Int. Cl.[6] ..................................................... A23N 5/00
[52] U.S. Cl. ................... 99/571; 99/572; 99/579; 99/580; 99/581
[58] Field of Search .............. 99/568–583; 426/481–483

[56] References Cited

U.S. PATENT DOCUMENTS

| | | | |
|---|---|---|---|
| 1,073,694 | 9/1913 | Love | 99/572 |
| 1,133,121 | 3/1915 | Gebhardt | 99/572 |
| 1,208,324 | 12/1916 | Jones | 99/572 |
| 1,273,974 | 7/1918 | Woodson | 99/572 |
| 1,470,247 | 10/1923 | Wilms | 99/572 |
| 1,482,018 | 1/1924 | Leonard | 99/572 |
| 2,010,794 | 8/1935 | Albrecht et al. | 99/572 |
| 2,695,642 | 11/1954 | White | 99/572 |
| 4,418,617 | 12/1983 | Quantz | 99/571 |
| 4,838,155 | 6/1989 | Steffel | 99/582 |
| 5,247,879 | 9/1993 | Frederiksen et al. | 99/575 |
| 5,325,769 | 7/1994 | Filice et al. | 99/580 |

*Primary Examiner*—Timothy F. Simone
*Attorney, Agent, or Firm*—William E. Thomson, Jr.; Sean A. Luner

[57] ABSTRACT

A process for splitting pistachios including a bin dumper, a sizer, moisturizers, blowers and splitting units arranged in seriatim. The blower removes excess water and particles from the nut surfaces after moisturizing and before splitting. The splitter includes a controlled surge bin having a brush gate associated with a sensor to control flow to a singulator. A vibrated singulator operates to release nuts to a splitting mechanism having opposed elements with cavities aligned to receive the ends of the nuts. Cradles retain the nuts in alignment for compression. Lateral vibration is induced in the cradles to ensure placement of the retained nuts.

12 Claims, 5 Drawing Sheets

5,511,470

APPARATUS FOR SPLITTING PISTACHIOS

BACKGROUND OF THE INVENTION

The field of the present invention is the processes and apparatus for splitting pistachios which have not opened naturally.

Pistachios are the seed of a small tree of the cashew family. They are referred to as nuts and they come in a hard smooth shell. This shell tends to split along one side when the nut matures. A, a significant portion of the harvested nuts are not naturally split. However, the consumer market demands nuts with the shells split.

Mechanisms have been devised for separating the split nuts from those where the shell has not split. One such mechanism includes a large slowly rotating drum with short fine rigid wires extending into the drum. The split shells become hooked on the wires and ride up on the rotating drum to a higher level than the nuts which have not become hooked. A collector placed upwardly in the drum is positioned to collect the hooked nuts which ultimately fall from the surface of the drum as the drum arches over toward the uppermost position thereof. The unsplit nuts remain in the bottom of the drum and ultimately work their way to the other end. These unsplit nuts are separately collected.

The value of the unsplit pistachios is significantly less than that of the naturally split nuts. To enhance the value of the unsplit nuts, they may be artificially split. A number of ways have been devised for artificially splitting pistachios.

From early times through the present, pistachios have been hand split. Currently it has been found economical to ship the nuts from the United States to China for hand splitting and then return them for sale at a higher price. Many hand devices are understood to be used such as pliers and the like to squeeze the nut until it splits.

Another mechanism which has been devised is to pass the nuts through a tapered area between a rotating conical mandrel and a concentrically arranged cylinder. The nuts must be distorted in compression to pass beyond the mandrel. This distortion is intended to split the nut artificially.

A more promising method has been devised which includes moisturizing the unsplit nuts to soften the shells, making them more resilient. The pistachios with softened shells are then released from the moisturizer and fed to a splitter. Such splitters employ bins for receiving the nuts. The nuts are fed to singulators which include horizontal troughs. A slide plate is positioned in the bottom of the trough and has holes of a size able to receive an individual pistachio. The slide plate has two positions. The first position is with the holes underneath the trough so as to receive nuts retained within the trough. The second position is with the holes outwardly of the trough and above an inclined plate such that the nuts may drop through the holes in the slide plate to the splitter mechanism. The slide plate then returns to the first position to pick up more nuts such that the process may be repeated.

The singulated nuns drop into individual cradles which are U-shaped in cross section and have an elongate axis extending between a movable splitting head and a stationary splitting jaw. Once the singulator has cycled so as to release individual nuts into the cradles, the movable splitting head is moved toward the splitting jaw. The softened shells of the pistachio nuts are split by the pressure placed on the ends. Once split, the cradles are pulled from beneath the nuts to fall on conveying mechanisms. The nuts are then dried and otherwise processed for sale.

Some difficulties have arisen with the last-mentioned mechanism. The moisturizing is most conveniently done in batches. Consequently, the softened nuts are presented to the splitting mechanism in surges. The surges have been found to alternately overpack or starve the singulator such that the mechanism does not operate efficiently. Further, the nuts presented to the cradles can land haphazardly and also can slide from position during the splitting process. The moisturizing process can also result in the colored membrane of the nut breaking up and sticking to the outside shell. The moisture involved causes the membrane to bleed onto the shell which is of sufficient porosity to receive the color. Consequently, the nuts can take on an unsightly appearance.

SUMMARY OF THE INVENTION

The present invention is directed to an improved method and apparatus for the automatic splitting of pistachios.

In a first separate aspect of the present invention, a mechanism is provided for carefully controlling the flow of pistachios to the singulator. A pivotal brush mechanism associated with a bin provides a measured flow of nuts to a singulating trough. The amount of nuts in the trough is sensed to control the brush.

In a second separate aspect of the present invention, pistachios are kept from being ejected from the jaw mechanism by the provision of opposed cavities on either side of the squeezing mechanism. The small cavities capture the ends of each nut and retain it during the splitting process.

In a third separate aspect of the present invention, U-shaped cradles are vibrated laterally of their elongate dimension by means of a vibration generator so as to more appropriately orient each nut prior to the squeezing and splitting process.

In a fourth aspect of the present invention, excessive moisture and pistachio membrane is blown from the nut surface between the cooking and splitting processes. This prevents color degradation of the nut and can reduce the accumulation of material on the splitting device.

Accordingly, it is an object of the present invention to provide improved apparatus and method for the splitting of pistachios. Other and further objects and advantages will appear hereinafter.

DETAILED DESCRIPTION OF THE PREFERRED EMBODIMENT

Figure 1:
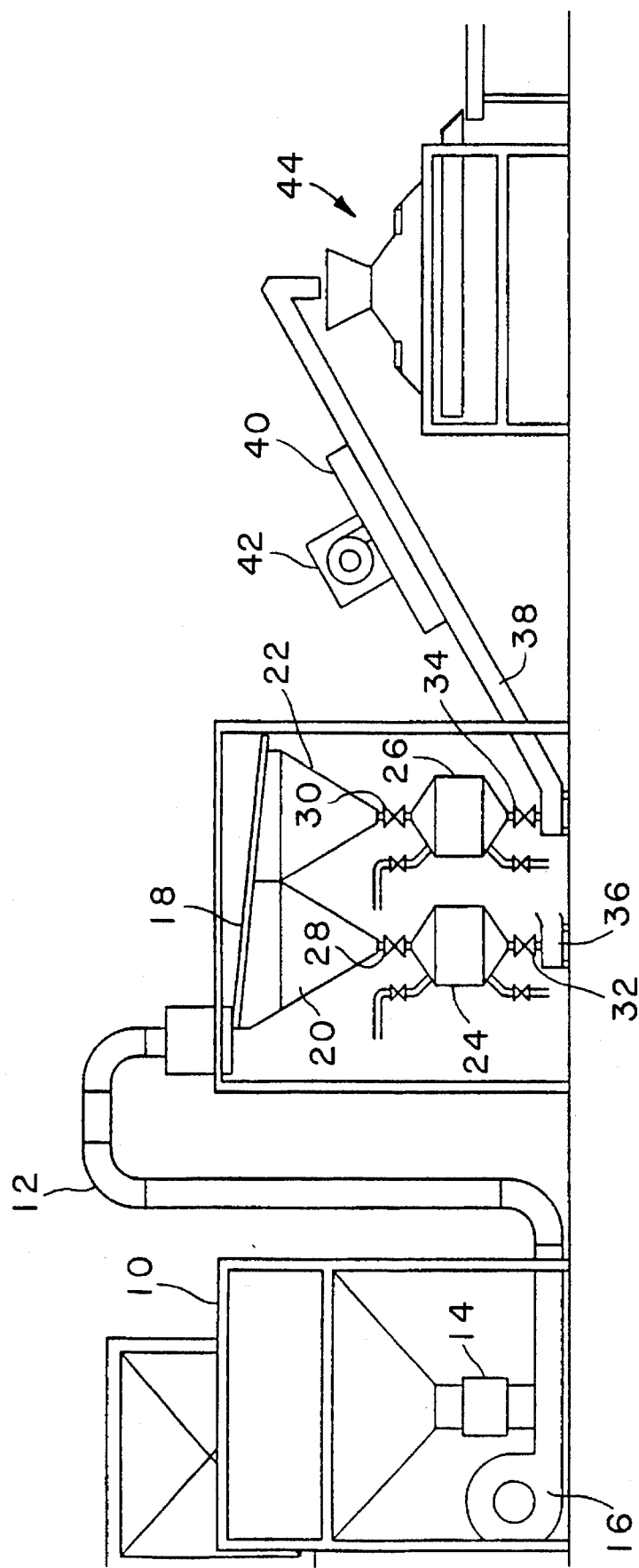
FIG. 1 is a schematic of a process for splitting pistachios.
Figure 2:
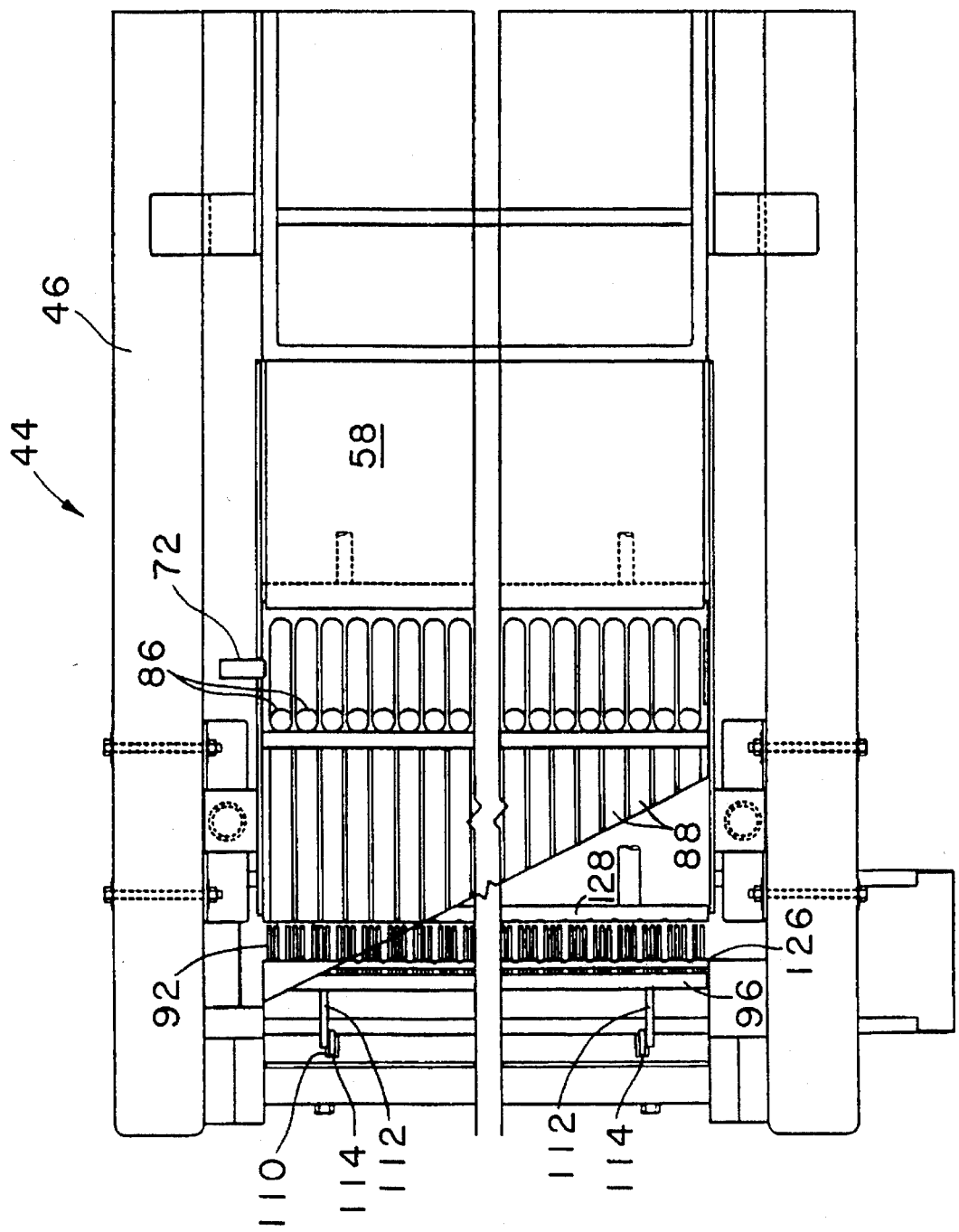
FIG. 2 is a plan view of a pistachio splitter.
Figure 3:
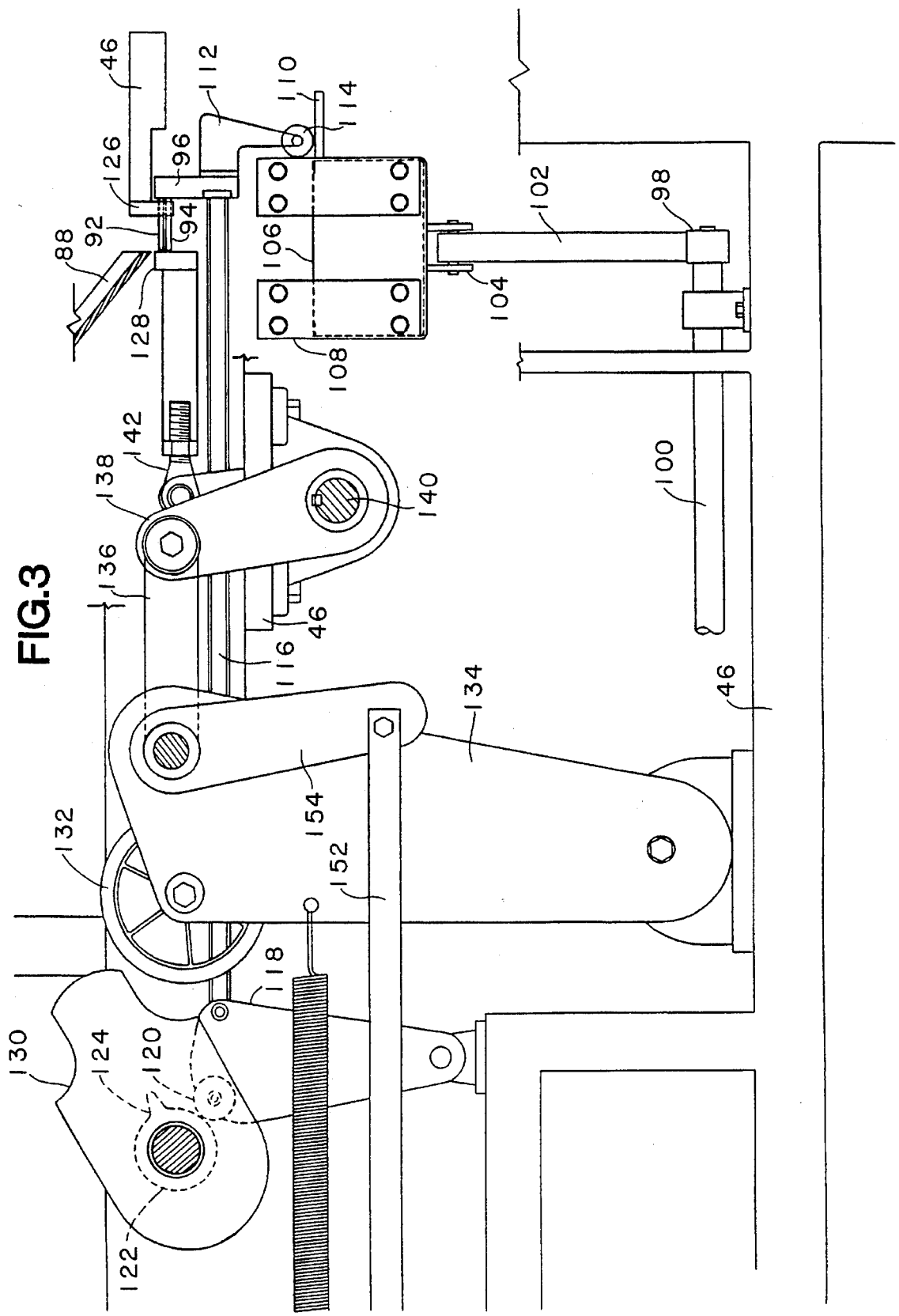
FIG. 3 is a side view of a pistachio splitter.

Turning in detail to the drawings, FIG. 1 illustrates schematically an overall system for processing unsplit pistachios. A bin dumper 10 receives the unsplit pistachios. A pneumatic elevator 12 is located below and is coupled with the bin dumper. A vibratory feeder 14 meters product to the pneumatic elevator 12. A blower 16 in the pneumatic elevator 12 lifts the product up to a sizer 18. The air is discharged through fabric filter bags.

A sizer 18 is arranged at the end of the pneumatic elevator 12 and includes counterrotating cylinders which diverge one from the other and are also inclined pistachios presented at the converging end of the cylinders will move down the slope until the space between cylinders is wide enough to accommodate each nut. At this point, the individual nuts will drop through to a selected surge hopper 20 and 22. The rate of flow of pistachios is preferably such that the surge hoppers 20 and 22 fill at a rate so that the supply of pistachios may be continuous. The rate may average the intermittent flow from the surge hoppers 20 and 22 so that the incoming pistachios never overfill these hoppers 20 and 22.

The pistachios are processed in a batch manner through moisturizes 24 and 26. Inlet valves 28 and 30 control the surge of pistachios into the moisturizers 24 and 26. The moisturizers 24 and 26 are conveniently cylindrical chambers with a series of valves that control both product and water flow. The product may be fed from an individual surge hopper 20 and 22 into one of the moisturizers 24 and 26 as controlled by the inlet valves 28 and 30. Batches of up to 400 pounds are contemplated. Water is then allowed to fill the chamber and soak into the nuts. The water temperature and dwell time are empirically determined to achieve the best splitting results. The higher the water temperature, the shorter the dwell time normally required. Discharge valves 32 and 34 may be opened after the water is drained off the product with the product being deposited on inclined conveyors 36 and 38. The schematic of FIG. 1 only illustrates the successive equipment for only one of the inclined conveyers 36 and 38. The other line may include identical equipment with the splitter adjusted for variations in product size.

The conveyor 38 is preferably one having interstices therethrough for the drainage of moisture from the pistachio product. Along the conveyor 38, a hood 40 and blower 42 are arranged to direct ambient air through the product. The air removes excess moisture from the surface without drying the nuts. The surface may be dried to the point that pistachio membranes adhering to the surface of the nuts will be blown off. This prevents a dying of the nut surface creating a nonuniform appearance.

From the end of the inclined conveyor 38, the pistachios are deposited in a splitter unit 44. From the splitter unit 44, conveyors direct the split nuts to dryers and other processes which may be desired. A second separation of split and unsplit nuts may be made if needed.

Looking to the splitter unit 44, reference is made to FIGS. 2 through 7. The splitter unit 44 includes a frame 46 supporting the elements of the unit. A surge bin 48 is mounted atop of the splitter unit 44 to receive the pistachios from the inclined conveyor 38. The moisturizing process creates a surge in the flow as the process is conducted by bath. Consequently, the surge bin 48 must be sized to accommodate such surge flow. The bin 48 includes sides 50 and 52 which are converging to a slot 54 extending horizontally across the bottom of the bin 48. A first control on the slot 54 is provided by a movable plate 56 bolted to the side 52. The movable plate 56 is preferably positioned such that the main weight of the nuts within the bin 48 is not transmitted through the slot 54. At the same time, the movable plate 56 is preferable adjusted so that more nuts can flow through the slot 54 than can be directly accommodated by the equipment downstream. In this way, flow control can be easily exercised.

An inclined ramp 58 is arranged below the surge bin 48 to receive pistachios from the slot 54. Associated with the inclined ramp 58 is a flow control mechanism including a brush 60. The brush 60 includes a rod 62 which is pivotally mounted relative to the inclined ramp 58. Extending from the rod 62 along the full length of the slot 54 are bristles 64 which are biased against the inclined ramp 58. This bias may be controlled by pivotal motion of the rod 62 depending on flow requirements. A pneumatic cylinder 66 is coupled to the rod 62 by means of a lever 68. The cylinder 66 can control the bias of the bristles 64 against the inclined ramp 58 and in turn the flow rate of pistachios from the surge bin 48.

The inclined ramp 58 terminates into a singulating horizontal trough 70. This trough extends across the full width of the inclined ramp 58 to receive pistachios passing under the brush 60. A sensor 72 may employ a common electric eye with a reflector arranged at either end of the trough 70. The sensor 72 may be positioned so that it is able to sense a specific level of pistachios in the trough 70. With the trough full, the actuator provided by the pneumatic cylinder 66 is activated to cause the bristles 64 of the brush 60 to move into greater bias against the inclined ramp 58 to restrain flow of pistachios from the surge bin 48. As the level of nuts decreases, the actuator again allows greater flow. The brush 60 should be arranged such that major cycling is not experienced.

Figure 4:
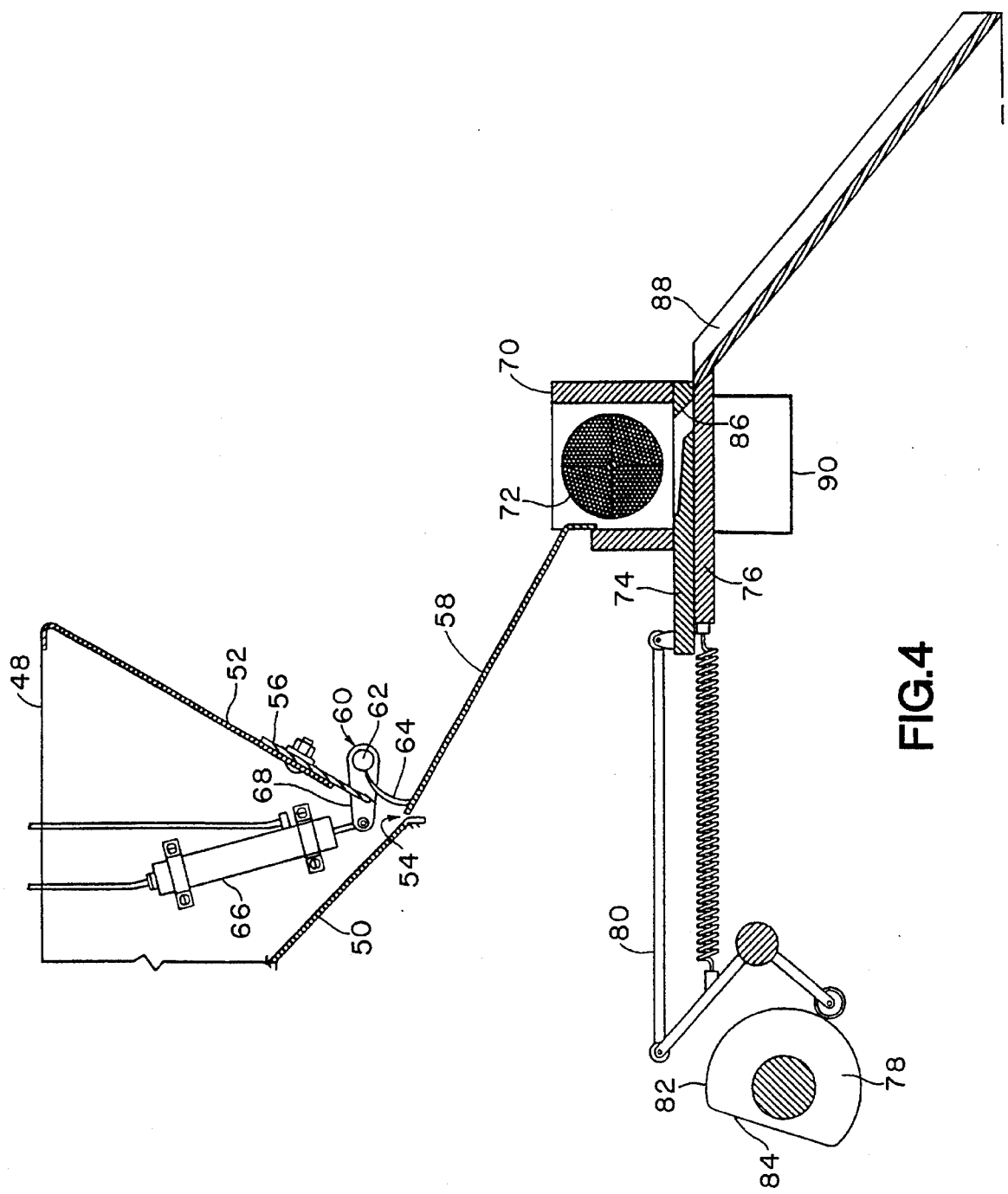
FIG. 4 is a side cross-sectional view of a feed and singulating system of a pistachio splitter.
Figure 5:
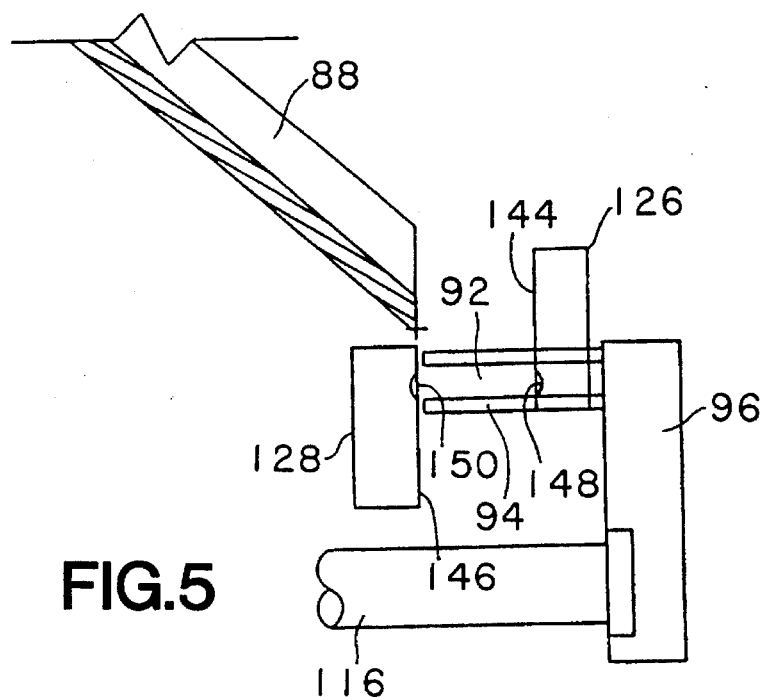
FIG. 5 is an end view of the splitter mechanism of a pistachio splitter.
Figure 6:
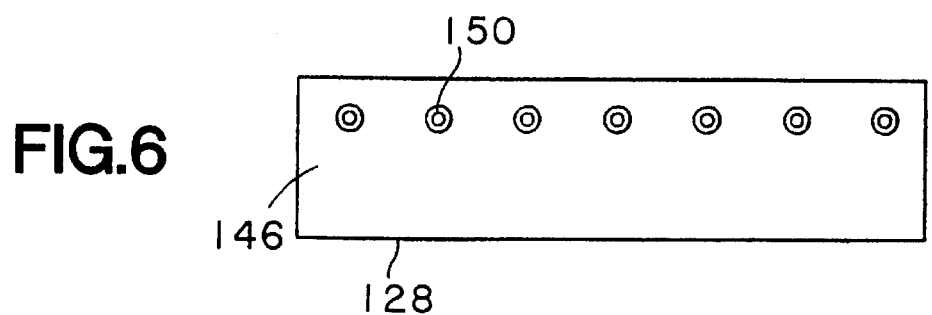
FIG. 6 is a front view of the splitting head.
Figure 7:
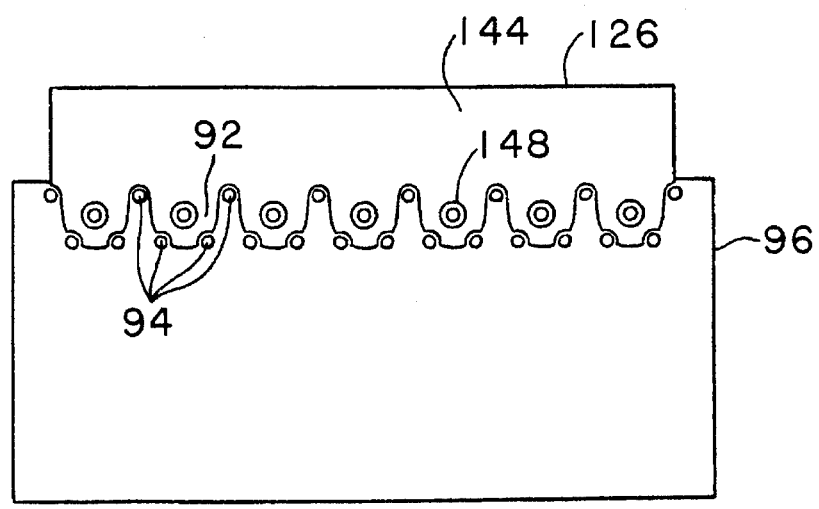
FIG. 7 is a front view of a splitter jaw.

A singulator is located beneath the horizontal trough 70 and includes a slide plate 74 mounted above a fixed plate 76. The slide plate 74 is controlled by a cam 78 and associated linkage 80. The cam 78 is arranged with a circular portion 82 which maintains the slide plate 74 in a first, retracted position as seen in FIG. 4. A flat surface 84 results in the movement of the slide plate 74 to a second position achieved at the middle of the flat surface 84 of the cam 78.

The slide plate 74 includes a plurality of holes 86. The holes open upwardly to the horizontal trough 70 with the slide plate 74 in the first position. The holes 86 are sized and arranged each to receive a single pistachio such that the pistachio would lie fully beneath the upper surface of the slide plate 74. All other nuts in the area of each hole 86 would extend upwardly into the horizontal trough 70 with one such pistachio fully positioned within each hole 86. Movement of the slide plate 74 under the influence of the cam 78 to the second position causes the forward side of the horizontal trough 70 to wipe across the holes 86 to retain in the trough 70 all but the pistachios lying fully within the holes 86. In the second position, the holes 86 extend beyond the fixed plate 76 such that the pistachios contained within the holes 86 may drop out the bottom. The nuts are received in inclined slots 88 located beneath the holes 86 with the slide plate 74 in the second position. To enhance the operation of the singulator, a common vibration generator 90 may be fixed to the underside of the device.

The inclined slots 88 are arranged so that the nuts passing from the singulator will not significantly increase in momentum. Preferably the slots are also slippery so that significant angular momentum is also not imparted to the nuts. It has been found that a slope of 40° from the horizontal insures flow of the singulated nuts and yet does not increase linear and angular momentum to a point that the nuts will not remain appropriately arranged in the equipment.

Located at the lower end of the inclined slots 88 is the splitting mechanism. Cradles 92 are arranged in alignment with each slot of the inclined slots 88. The cradles are defined by pins 94 extending horizontally from a cradle bar 96. The locations of each of four adjacent pins define an elongated cavity which is generally U-shape in cross section. The cavities are configured to receive a single pistachio per cavity arranged with the long axis of the pistachio laying along the elongated direction of the cradle 92.

To insure appropriate placement of each pistachio in a cradle 92 defined by the pins 94, the cradle bar 96 is horizontally vibrated. An eccentric bushing 98 is arranged on a shaft 100 rotatably mounted to the frame 46. A rod 102 is associated with the eccentric bushing 98 and extends at a significant angle upwardly to a clevis mount 104 on the bottom of an exit trough 106. The exit trough 106 is mounted to the frame by means of flex plates 108 which allow horizontal movement in the trough 106. A support plate 110 is mounted to the exit trough 106 and in turn supports the cradle bar 96. The cradle bar 96 includes two rigid arms 112 which extend downwardly to rollers 114. The rollers rest upon the support plate 110 to support the cradle bar 96 in position. The vibration induced by the eccentric bushing 98 is transmitted through the support plate 110 to the rollers 114 in the direction of the axis of the rollers. The vibration is transmitted from the rollers 114 to the cradle bar 96 and in turn to the pins 94. In this way, the cradles 92 are vibrated sideways to better seat the pistachios along their long axis.

The cradle bar 96 is associated with a rod 116 which extends to a pivoted arm 118. The arm 118 is pivoted to the frame 46 and includes a follower 120 associated with a cam 122. The movement of the cam 122 controlling the rod 116 is in a direction that the rollers 114 can roll along the support plate 110. The cam 122 has a lobe 124 which causes the cradles 92 to move to the right as viewed in FIG. 3. As will be discussed below, this allows the pistachios to fall from the cradles 92 into the exist trough 106 so as to be moved from the splitter unit 44.

Fixed on the frame 46 is a splitting jaw 126. The jaw 126 includes a lower scalloped section arranged to accommodate the pins 94 as can best be seen in FIG. 7. As the splitting jaw 126 is stationary relative to the frame 46 and the cradle bar is movable under the influence of the cam 122 as discussed above, the splitting jaw 126 wipes the pistachio from the cradles 92 as the lobe 124 moves the cradle bar 96 toward the right as viewed in FIG. 3. The nuts fall into the exit trough 106 to be conveyed from the equipment.

Opposed to the splitting jaw 126 is a splitting head 128. The splitting head is slidably arranged on the frame 46 and is controlled by a cam 130. The cam 130 operates through a follower 132 mounted to a pivoted arm 134 which is pivoted on the frame 46. A link 136 is shown in the present embodiment to be coupled with a bell crank 138 pivotally mounted to the frame 46 about a shaft 140. A threaded pin 142 which is adjustable relative to the splitting head 128 transfers motion from the bell crank 138 to the head 128 such that the head 128 moves toward the splitting jaw 126.

The splitting jaw 126 and the splitting head 128 have splitting surfaces 144 and 146, respectively. Cavities 148 are located in the splitting surface 144 which are located aligned with cavities 150 located in the splitting surface 146. The cavities 148 and 150 are also aligned with the cradles 92 such that they are positioned to encounter the ends of a pistachio sitting longitudinally aligned in the cradles 92. The movement of the splitting head 128 induced by the cam 130 is adjusted such that pistachios laying within the cradles 92 will be first gripped by the cavities 148 and 150 and then compressed lengthwise to induce rupture of the shells at the seams. The moist and, therefore, flexible shells otherwise are able to deform without cracking at other positions.

The arrangement of the cams 78, 122 and 130 are such that the pins 94 move with the cradle bar 96 just ahead of the splitting head 128. The splitting head 128 is also retracted before the cradle bar returns in order that the pistachios now held in the cavities 148 and 150 may drop through the cradle position into the exit trough 106. Through coordination of the cams 78, 122 and 130, the mechanisms may be timed such that the singulator releases nuts timely to slide into the cradles for immediate compression and release. As depicted in FIG. 1, the splitter is arranged to have two splitter mechanisms. The link 152 associated with the lever arm 154 may be used to drive the other side.

Accordingly, an improved pistachio splitting mechanism and method have been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A pistachio splitter comprising a support means;
   a movable splitting head including a first splitting surface that moves relative to the support means;
   a splitting jaw secured to said support means, said jaw including a second splitting surface, said first and second splitting surface being opposed;
   cradles extending between the first and second splitting surfaces being opposed;
   cradles extending between the first and second splitting surfaces and being elongated in a direction perpendicular to the first and second splitting surfaces; and
   a vibration generator having a bottom end and a top end, said bottom end connected to said support means and said top end connected to the cradles to vibrate the cradles laterally.

2. The pistachio splitter of claim 1, said cradles being U-shape in cross section.

3. The pistachio splitter of claim 1, the first and second splitting surfaces having first cavities and second cavities, respectively, the first cavities being aligned with the second cavities, respectively, with the cradles being aligned therebetween, respectively.

4. A pistachio splitter comprising
   a support means;
   a movable splitting head that moves relative to the support means including a first splitting surface having first cavities;
   a splitting jaw secured to said support means, said jaw including a second splitting surface having second cavities, the first and second splitting surfaces being opposed and the first cavities and the second cavities being aligned, respectively;
   cradles extending between the first and second splitting surfaces, each of the aligned first and second cavities being further aligned with each of the cradles, respectively; and
   a vibration generator secured to the support means at one end and connected to the cradles at the other to vibrate the cradles laterally.

5. The pistachio splitter of claim 4 further comprising a plurality of inclined slots secured to the support means and positioned above the first splitting surface and the second splitting surface, such that each of said inclined slots aligns with the cradles.

6. The pistachio splitter of claim 4 where the cradles are comprised of a plurality of pins.

7. The pistachio splitter of claim 4 further comprising a cradle bar, where one end of each cradle is secured to the cradle bar.

8. The pistachio splitter of claim 7 where the cradle bar can move relative to the support means in a direction perpendicular to the first splitting surface and the second splitting surface.

9. The pistachio splitter of claim 4 where an exit trough is positioned below the cradles.

10. The pistachio splitter of claim 1, further comprising a moveable cradle bar where said cradle bar moves towards and away from the splitting head in a direction perpendicular to the first splitting surface and the second splitting surface, with one end of said cradles secured to the cradle bar such that when the cradle bar is positioned farthest from the splitting head, a gap exists between the cradles and the splitting head.

11. The pistachio splitter of claim 10 where said vibration generator is attached to said cradles thorough the cradle bar.

12. The pistachio splitter of claim 11 where said splitting head is associated with a cam that controls the movement of the splitting head.

* * * * *